United States Patent [19]

Moore et al.

[11] 4,372,725

[45] Feb. 8, 1983

[54] MULTI-WHEELED TRANSPORTER AND CONVEYING VEHICLE

[75] Inventors: Michael J. Moore, Naples; Charles F. Studley, Jr., Arcadia, both of Fla.

[73] Assignee: Good Earth Growers, Inc., Arcadia, Fla.

[21] Appl. No.: 355,276

[22] Filed: Mar. 5, 1982

[51] Int. Cl.³ .............................................. B60F 1/38
[52] U.S. Cl. ................................. 414/460; 180/236; 180/242; 414/495; 414/523; 414/528
[58] Field of Search .............. 414/460, 495, 523, 528; 180/236, 242

[56] References Cited

U.S. PATENT DOCUMENTS

| | | | |
|---|---|---|---|
| 860,622 | 7/1907 | Bannerman et al. | 414/495 |
| 3,064,745 | 11/1962 | Colt et al. | |
| 3,380,546 | 4/1968 | Rabjohn | |
| 3,534,825 | 10/1970 | Reffle | |
| 3,534,880 | 10/1970 | Washburn | |
| 3,655,076 | 4/1972 | Carder et al. | |
| 3,854,610 | 12/1974 | Carder | |
| 3,861,535 | 1/1975 | Huxley et al. | |
| 4,089,384 | 5/1978 | Ehrenberg | |
| 4,171,927 | 10/1979 | Aoyama | 414/495 X |
| 4,219,094 | 8/1980 | Sturgill | |

*Primary Examiner*—Robert G. Sheridan
*Attorney, Agent, or Firm*—David H. Semmes; Warren E. Olsen

[57] ABSTRACT

A multi-wheel transporter vehicle of the straddle-type comprising first, second, third and fourth vertically extending corner upright members, each corner upright further comprising a wheel assembly at the lower end thereof and first drive means operable to control one or more of said wheel assemblies in either a normal or lateral direction, with a longitudinally extending endless conveyor platform assembly including second drive means for selectively defining a linear motion in the longitudinal direction for said conveyor, between said uprights.

10 Claims, 15 Drawing Figures

STEERING FEEDBACK TIMERS

FIG. 10 TRANSPORTER STEERING MOTOR DRIVE CIRCUIT

MULTI-WHEELED TRANSPORTER AND CONVEYING VEHICLE

BACKGROUND OF THE INVENTION

1. Field of the Invention

A transporter enabling the straddling of longitudinally-extending rows, such as are found in a plant nursery environment, wherein the transporter further enables a longitudinal conveyance between four vertical uprights for non-palletized items, such as potted plant articles.

2. Brief Description of the Prior Art

Prior workers have developed straddle-type transporter vehicles, for particular purposes and with unique capabilities for the function intended. For example, Sturgill, U.S. Pat. No. 4,219,094, illustrates a multi-wheel straddle-type vehicle having central lifting means, wherein his particular structural connections of the vertical corner members provide surprisingly good operation over uneven terrain.

Washburn, U.S. Pat. No. 3,534,880, illustrates a non-powered straddle-type vehicle, for the purpose of supplying a portable, hand-operated mechanism to transport a carpet roll, or other form of hollow core device, which conveniently may be placed upon a transversely extending core member, which in turn can vertically be raised or lowered between a pair of longitudinally extending frames.

Colt et al., U.S. Pat. No. 3,064,745 illustrate an approach to materials handling wherein a fixed conveyor rides upon a powered vehicle bed which has the ability of various steering and power transmission directly from motors to individual wheels. The present invention shares certain of this known technology, in the sense that separate power is provided to at least two of the four independent wheel assemblies. Similarly, Ehrenberg, U.S. Pat. No. 4,089,384 illustrates known traction driving for separate independent wheel control, wherein a central hydrauic motive power source is employed to apply traction to individual wheel assemblies. The present invention has a preferred embodiment with electric motive drives, through hydraulic equivalents are, of course, contemplated for the identical functions required.

Carter, U.S. Pat. No. 3,859,610 illustrates a known form of freight transporter wherein an elevation function is provided by a scissor-jack mechanism, beneath a roller assembly. Carter also illustrates a single chain which is attached to individual slats, wherein the slats are themselves supported upon a plurality of rollers, as they are used to convey.

Carder et al., U.S. Pat. No. 3,655,076 illustrate a pallette handling system, wherein an unpowered series of dollies are interconnected with a motive power source, in order to transfer material onto a carrying device. Carder et al. also illustrates those prior art approaches which require separate vehicle elements, to move material from a first elevation to a second elevation.

The patents to Reffle, U.S. Pat. No. 3,534,825 and Rabjohn, U.S. Pat. No. 3,380,546, are noted to illustrate known vehicle drive systems wherein individual motors are employed directly to drive, through worm and pinion or chain-drive arrangements, individual wheels of a vehicle.

The patent to Huxley, U.S. Pat. No. 3,861,535, illustrates another known form of straddle vehicle, wherein a forklift mechanism is arranged to be positionable at various vertical heights, in response to a driver input.

The prior art devices, in each case, evidence a unique configuration for the purpose intended, for example, aircraft unloading, or a motive drive with the ability to distribute unsprung weight, for example. However, it has remained a problem in certain applications, such as harvesting and distribution of nursery stock, to accommodate the topography of a nursery, as well as the individual pots or plants which are being nurtured. In particular, in a nursery environment, it is critical to have rapid access to various locations in the field, for selecting among desired items, without inordinate manpower waste through following narrow paths and manually moving a desired selection back to a waiting truck, for example. The present invention has the unique ability of enabling a sequential loading of a longitudinally-extending conveyor means at various locations, and at various vertical elevations, and also the ability to convert a generally longitudinal direction of travel, to a complete orthogonal or lateral direction of travel, simply by an operator choice at his control system.

It is also very desirable in a commercial nursery environment, to have a vehicle which is capable of a creep, wherein that slow vehicle movement can be coordinated with a motion of a conveyor system, for timing of on-take onto the conveyor, and off-take of the conveyor at a rearward station, for example, by a second crew at selected points along a path of vehicle travel. While the present invention provides a side-straddle location for an operator, it easily is adaptable to a remote control position, where an operator can sit in an overhung front position, for example, and participate in the loading of non-palletized materials, as the entire conveyor is selectively bumped or indexed, from his operating position.

It also would be desirable to have a straddle device which quickly and easily could overcome fixed obstacles extending between the longitudinally-extending sides of the device, so that large nursery stock, for example, can be by-passed without need for diverting the transporter around what otherwise would be an obstacle to continued movement in a direction.

Accordingly, it is the primary object of the invention to provide an improved multi-wheel transporter vehicle of the straddle-type, comprising the ability selectively to be driven through two or more of the four wheel assemblies at the bottom of four vertically-extending columns but with steering control at each wheel assembly. A related object of the invention is to provide such a vehicle having the ability to independently control the steering of all four wheel assemblies to enable a quick change from normal to a complete lateral motion, if desired. A related and further object of the invention is a transporter vehicle having a control system sensitive to the needs of independent controls for various conveyor speeds and vertical positions, to enable a number of combinations of speeds and directions for the various driving functions enabled by the device.

These and other objects and advantages will become more apparent from a review of the written description of the invention which follows, as also illustrated and disclosed in the accompanying drawings.

SUMMARY OF THE INVENTION

The present invention has for its primary object the handling of discrete items wherein movement on a given path, or at a right angle to that path, is also required. The preferred embodiment is illustrated for a nursery operation, wherein the efficient moving of container materials from or to grid locations on a nursery field is a labor-intensive task, which substantially would be assisted by the present invention. The device manifestly has further use in a variety of or materials handling environments, wherein non-palletized materials need to be moved as, for example, in a warehouse operation for furniture stores, wherein carpet or tile goods have to be selectively brought to a central location, or in any other environment where the materials to be moved are irregular, and do not lend themselves to palletization.

The improved multi-wheel transporter vehicle of the present invention is a self-propelled land vehicle preferably powered by two horsepower series-wound, 36 volt electric motors, with a wheel assembly at the lower end of each of four verticle columns, and diagonally opposite of said wheels being driven by said first drive means comprising such electric motors. Each of the four wheel assemblies further comprises individual electric steering devices. Between the columns is located a linear transportation device, preferably an endless conveyor platform, which approximately is 12 feet in longitudinal extent, and with an approximate 4½ foot lateral extent. This platform has a second drive means comprising electric motors to allow moving materials to be transported towards either end, and a third drive means to enable raising or lowering of the conveyor platform from an approximate 3 foot to an 8 foot height.

In the preferred embodiment, the vehicle has approximate dimensions of 12 feet in the longitudinal direction, 7 feet in the transverse direction, and 8 feet in the vertical direction, and is defined to have all its operations accomplished in a self-contained manner, without need for separate or external power input. Of particular value to the present device is the fact that the device has the ability immediately to laterally be moved, from a given starting position, through a steering control device which recognizes a normal steering mode, as opposed to a lateral steering mode. To ensure most effective traction a four-wheel drive is contemplated, and at minimum a diagonally-opposite wheel drive is provided to ensure good traction on uneven terrain, despite the direction of motion of the vehicle. To change from longitudinal to lateral movement, each wheel assembly is enabled to rotate 180 degrees forward, and may also be allowed 360 degree movement, should a particular wheel motor drive rotation make such a complete rotation desirable. Since motive force for a wheel assembly is direct to the driven wheel, and since steering is a separate drive means, maximum manuverability and exact control of direction for the device is ensured.

In the preferred embodiment, power is from a plurality of 6 volt heavy duty batteries which are located within one or more of two longitudinally-extending base units, which connect between and proximate the lower ends of first and third uprights, on a left side, and second and fourth uprights, comprising the right side of the device. The terms left and right are used for convenient reference, and in no way limit the invention, but simply are chosen for clarification of terminology, consistent with the presentations of a preferred embodiment in the attached drawings. A significant advantage of this vehicle is that it can be used, for example, in a nursery environment where the only real estate which need be dedicated for vehicle travel is a plurality of orthogonal rows of a width just wide enough to accommodate the width of each tire of the device, and the vehicle track. It currently is customary to provide two foot wide walkway paths, and such walkways easily are traversed with complete freedom of movement provided, due to the steering and drive system of the present invention. Existing nursery configurations, which provide for an approximate 70 inch wide planting space, separated by 24 inch wide walkways, easily can be maneuvered upon by the present device.

The preferred conveyor comprises slats, so that non-palletized material, such as 1 and 3 gallon containers, easily can be raised from a loading position (near the ground and just clearing the tops of other containers) to an upper level for off-loading by conveyor action at a truck bed, for example. Accordingly, the present device includes not only the ability to collect and transport containers in a field operation, but also to perform tasks of a forklift. Currently, any stand alone conveyor would have to be pulled upon a trailer by a tractor or other traction device, and would not be maneuverable as allowed by the instant invention.

To further enhance the utility and maneuverability of the present device, there also is taught a particularly effective control system for an electric drive wherein the motors respond to impulses from solid state SCR devices, to maximize efficiency and minimize battery drain. Through the use of selective pulses and pulse control, exacting controls upon the individual steering and drive of each of the four wheels can be executed, with a simple one-station manual control. A one station control of separate electric devices for conveyor motion and also conveyor speed also can be accomplished from a remote position. For example, a simple hand-held device could accomplish steering, through a joy stick form of potentiometer. To further illustrate principles and practice of the invention, a preferred embodiment hereafter is described, with reference made to a currently preferred implementation through several drawings.

DETAILED DESCRIPTION OF THE PREFERRED EMBODIMENT

Figure 1:
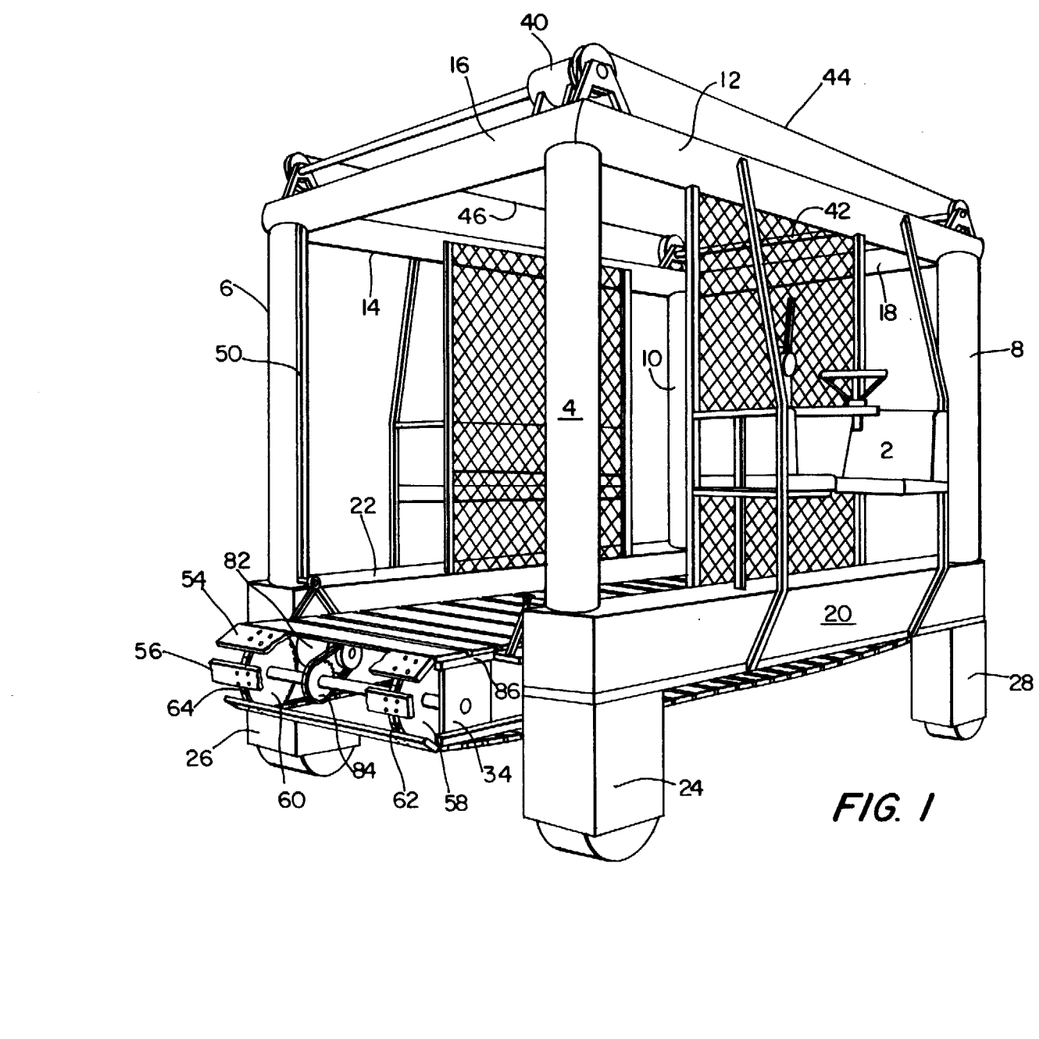
FIG. 1 is a three-quarter front perspective view, illustrating in schematic fashion, the mechanical elements of the present invention.

FIG. 1 illustrates, in three-quarter front view, a perspective representation of the general structure for a multi-wheel transporter vehicle, of the straddle-type, which has been constructed according to the principles of the present invention. The device comprises first, second, third and fourth vertically extending corner upright members (4, 6, 8, 10) with each corner upright further comprising a wheel assembly at the lower end thereof. For convenience, the first corner member (4) together with the third corner member (8) will be referred to as defining a longitudinal direction and also as defining a left side to the vehicle, without imparting any sense of limitation to the invention or the appended claims. Similarly, the second and fourth corner elements (6, 10) will be considered to define a right-side longitudinally extending aspect to the invention.

Figure 2:
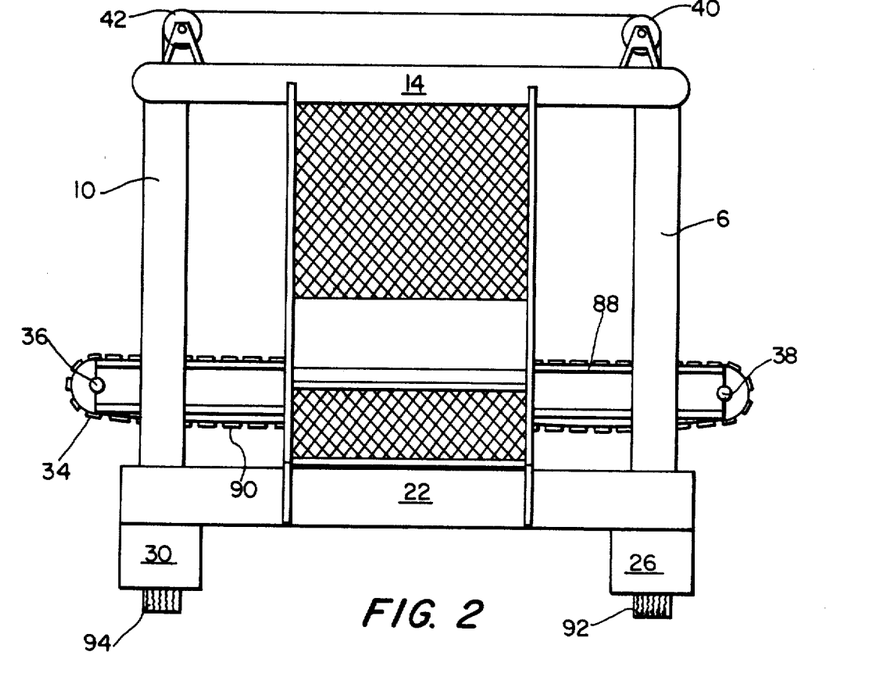
FIG. 2 is an elevation view of the right-side of the device depicted in FIG. 1.

The four corner uprights are connected by a left-side base unit (20) which preferably is located between and proximate the lower ends of the first and third corner uprights. A right-side longitudinally extending base unit (22) similarly is located between second and fourth uprights, and disposed also proximate the wheel assemblies at the bottom of each corner member. Further longitudinal stability of the device may be provided by upper brace members (12, 14) if increased rigidity to the vehicle frame is desired. With respect to the front and rearward aspects of the device, an essential requirement of the present invention is that a conveyor mechanism be allowed freely to travel vertically between upper and lower positions. Accordingly, there is no transversely extending member between the first and second uprights (4, 6) except for the front side upper brace unit (16). Similarly, the rear transverse extension of the device is defined simply by a rear-side upper brace unit (18) and in each case these transverse brace units are isolated proximate only the upper ends of each upright. In this manner, free motion of a conveyor assembly (34) is enabled, and maximum clearance. The conveyor shown in FIG. 1 is in a relatively lowermost position, which may be approximately three feet above a ground reference. Also shown in FIG. 1 is a wheel assembly at the bottom of each corner assembly. The first column (4) has a first wheel assembly (24) the second column (6) terminates at a second wheel assembly (26), the third column (8) has a lower wheel assembly (28) and the fourth column (10) has a lower wheel assembly (30), as shown in FIG. 2.

Also shown in FIG. 1 is an operator station (2) which is suspended and proximate the left-side base unit, to enable an operator a convenient perch, above likely obstruction, and also with full view of the respective operations of steering, direction and conveyor movement, both horizontally and vertically to accommodate obstacles within the straddle zone of the device. As shown most clearly in FIG. 2, the conveyor extends at least equal, and preferably longitudinally outside, of the boundaries of the frame of the transporter, and the conveyor is defined by a forward drive unit, 36, and a rear conveyor drive unit, 38. Trained around these units is an endless conveyor device, having a plurality of slats, which preferably are of redwood or other resistant material, and spaced apart to enable dirt or other debris from a non-palletized load to pass therethrough. As shown in FIG. 2, the bottom of the endless train will normally fall in a catenary, while the upper surface of the endless conveyor is to be edge supported on guide surfaces of the platform, as is shown more clearly in FIGS. 1 and 3. In FIG. 1 the partial section shows a first-slat (54) and a second representative slat (56) secured at preferably two locations through brackets to sprocket chains (62, 64) and supported upon the chains so that they will glide upon an upper guide rail (86) which serves to support further the weight superposed upon the upper surface of the conveyor. The second drive means for the conveyor comprises an electric motor (82) which drives, through a chain assembly, a sprocket (84) which in turn is directly connected to the first conveyor drive shaft (36.) An electrical control for this second drive means will be more particularly illustrated, hereafter. A third drive means also is illustrated in FIG. 1 for the conveyor system, and comprises a front elevational drive shaft (40) which may conveniently include a direct drive electric motor, together with a hoist arrangement comprising a left-side cable assembly (44) and a right-side cable assembly (46.) This third drive means is accomplished by having each cable in a right and left side pair and wrapped around the drive shaft (40) so that the distal ends of each cable pair downwardly extends and attaches at a front and rear location of the conveyor platform assembly (34). As shown in FIG. 1, guideways (50) can be located inwardly upon each of the vertical corner assemblies, to provide transversely opposed guiding mechanisms for the conveyor platform assembly.

Figure 3:
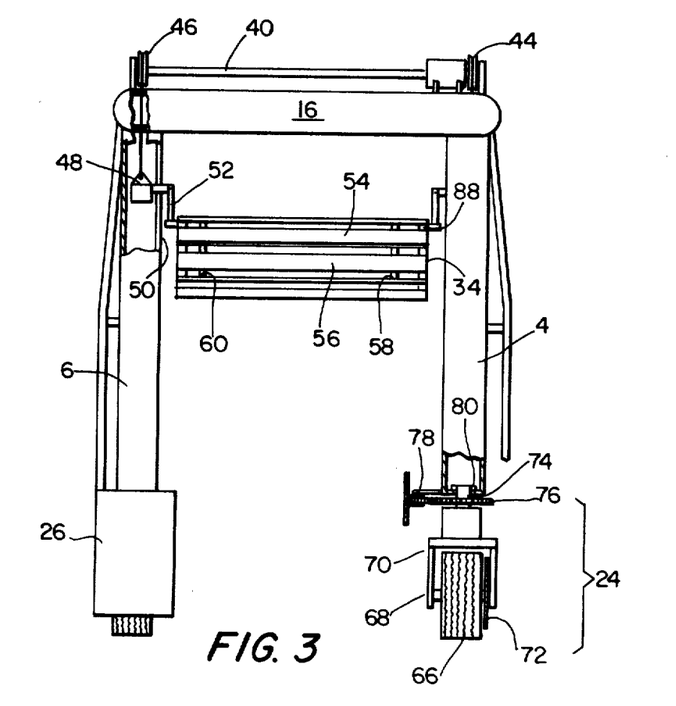
FIG. 3 is a front elevation view of the device of FIG. 1, with partial sections illustrating steering and drive mechanisms for each of the independently steered and driven wheels.

As shown most clearly in FIG. 3, a bracket (52) may be interconnected through the guideway (50) and attached to the distal end (48) of one of the right-side cable pair cables with a similar interconnection upon the left-side front guide member, through interconnection with the cable pair assembly (44). Each of the cable pair systems (44, 46) preferably is a tandem wrap about the drive shaft mechanism (40) with the first cable distal end running inside the rear left side vertical column and the second distal end running inside the front left side vertical column (4). Similarly, the right-side cable assembly (46) preferably includes a double winding arrangement. Accordingly, the motion of the single drive shaft (40) simultaneously will raise or lower both cable pair sets (44, 46) and raise or lower the conveyor platform against the restraints of the guideways.

FIG. 3, also illustrates in partial section a schematic for a preferred steering control, which is repeated for each of the wheel assemblies. In FIG. 3, the first wheel assembly (24) comprises a bearing and vertical rotational axis (80) with a driven gear (76) extending downwardly from a plate (74) at the bottom end of the first column (4). A worm gear (78) conveniently may be driven by an associated pinion gear, and connected to an electric motor positioned proximate the entire assembly. Such an electric motor drive is conventional, and is not shown, since its operation can be understood from the schematic shown for a mechanical steering accomplished through the gear (76), by worm (78). FIG. 3 also shows another aspect of the first drive means, which comprises a tire (66) mounted for rotation about a yoke (68) with a large diameter gear (72) fixedly mounted to the wheel supporting said tire. A chain, or other convenient mechanical interconnection, can then be trained around this wheel, and attached to another electric motor, which independently is configured to control that particular drive assembly. As noted hereinbefore, while steering is provided for each of the four wheel assemblies, drive is preferably only supplied by diagonally opposed motors, though a four-wheel drive is also within the scope of the present invention. FIG. 2 illustrates the right side of the transporter in elevation view, with the second wheel assembly (26) shown with its associated tire (92) in the lateral direction. The fourth wheel assembly (30) above shown with its associated tire (94) turned in the lateral direction. In view of the fact that each of these wheel assemblies includes a direct and independent steering, as shown in FIG. 3, a rapid lateral vehicle motion is easily accomplished, and particularly in view of the electrical controls which hereafter will be further illustrated.

All functions of the transporter are controlled simply from a central location, such as the driver's seat (2) with associated operator's console, as illustrated in FIG. 1. The functions provided to the driver are the conveyor motion, forward and reverse, a vehicle drive motion, forward or reverse including a creep speed. The vehicle can have a seat capability for not only the driver, but also passengers, as shown above the right-side member (22) in FIG. 2. As will be illustrated more particularly hereafter, all functions are interlocked to a key switch, and the drive functions are also interlocked to a seat switch, preferably, to prevent a run-away condition.

Preferably the device is powered by a battery source of electricity, such as 12 6-volt batteries, which conveniently can be located within the left and right side longitudinally-extending base units (20, 22) respectively. While the following preferred embodiment is for electrically controlled vehicle, a central source of motive fluid, as by a hydraulic pump, could also be used. Equivalent fluidic circuits, and hydraulic motors at each wheel, could provide steering functions through first fluid motors, and a drive to two or more wheels of the vehicle through second fluid motors. The pulse logic and analog circuits illustrated hereafter preferably are powered by separate Gelsel batteries, to prevent control malfunction as a consequence of primary power source failure. It is contemplated that battery charging can be accomplished by using the standard 36-volt charger, as commonly is available from the electric golf cart service industry.

Figure 4:
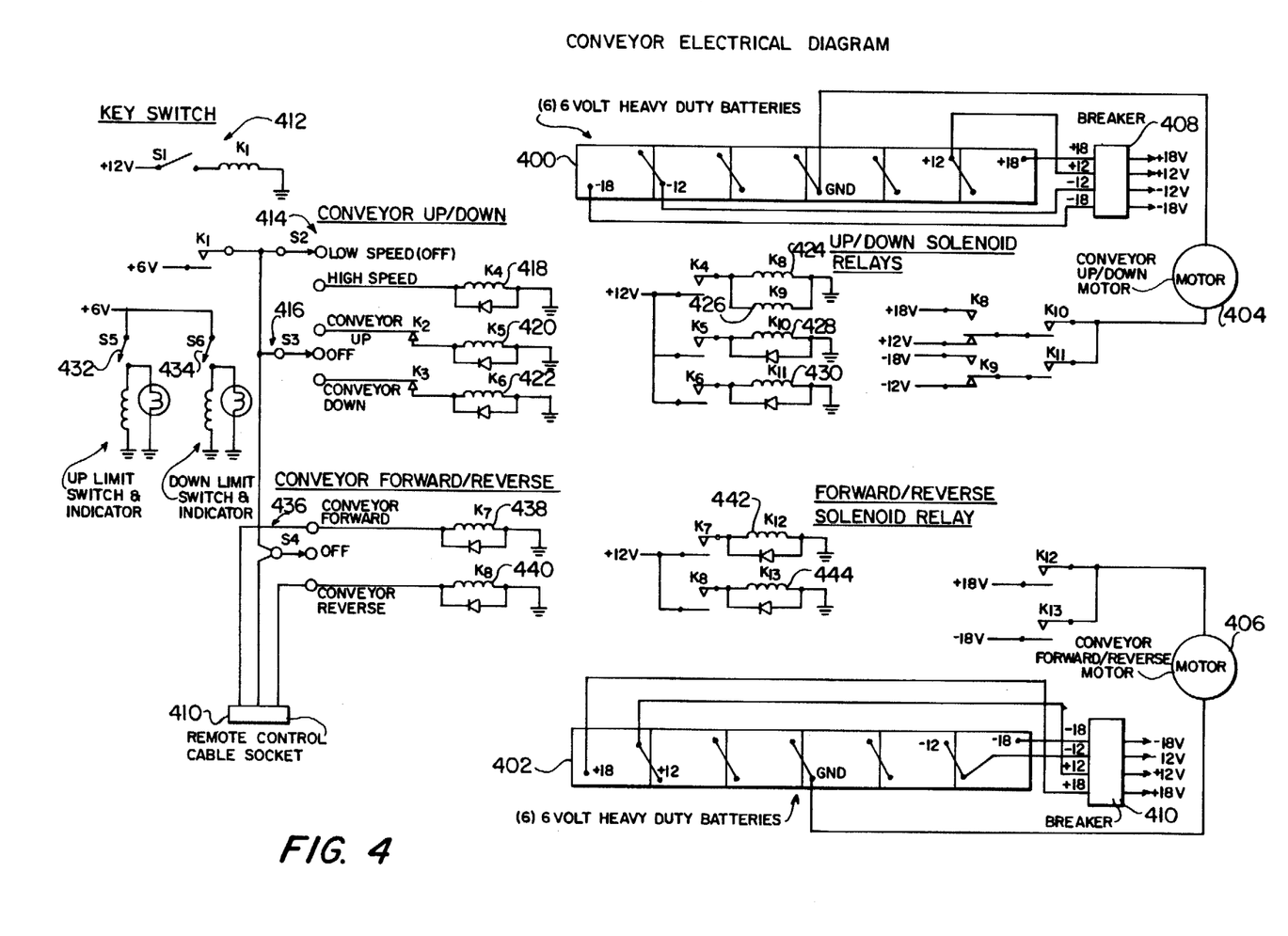
FIG. 4 is a schematic of a preferred conveyor electrical diagram.

The redwood slat conveyor illustrated in FIGS. 1-3, preferably is controlled by the conveyor electrical circuit illustrated in FIG. 4. The conveyor platform has two basic modes of operation, up/down and forward/reverse. The forward/reverse motion is accomplished by a second drive means, with the up/down motion separately controlled through a third drive means, as hereinbefore noted. Here again, remote operation is possible through a cable to the indicated socket (410).

Up/down control of the conveyor is done through switches S1, S2 and S3 (412, 414, 416), reed relays K4 through K6 (418, 420, 422), and solenoids K8 through K11 (424, 426, 428, 430). Key switch S1 applies 6 volts through K1 to the conveyor up/down switches. Conveyor up switch applies +12 volts to the conveyor up/down motor (40) in normal speed and +18 volts when high speed switch S2 is on. Conveyor down switch applies −12 volts to the conveyor up/down motor (404) and −18 volts for high speed down, magnetic hi limit switch S5 (432) and low limit switch S6 (434) are mounted on the vehicle upright (402) on which the conveyor moves to restrict conveyor travel to safe limits. The ¼ H.P. (2000 rpm) permanent magnet motor (302) belt drives A 96×1 worm gear which in turn drives the cable wind/unwind bar. Total speed reduction is approximately 400 to 1.

Forward/reverse control of the conveyor is done through toggle switch S4 (436) which applies 6 volts to reed relays K7 and K8 (438, 440) which in turn pick solenoid relays K12 and K13 (442, 444). When switch S4 is in the forward position +18 volts is applied to the conveyor motor (406). In the reverse position −18 volts are applied. The conveyor forward/reverse motor direct drives a gear reduction unit (77×1) which in turn chain drives the conveyor drive bar; total speed reduction is approximately 200×1. The motor is a ¼ HP, permanent magnet motor.

The preferred embodiment steering operation is illustrated in FIGS. 5, 6, 7, 8, 9 and 10, and that enabling disclosure will now briefly be reviewed.

Figure 5:
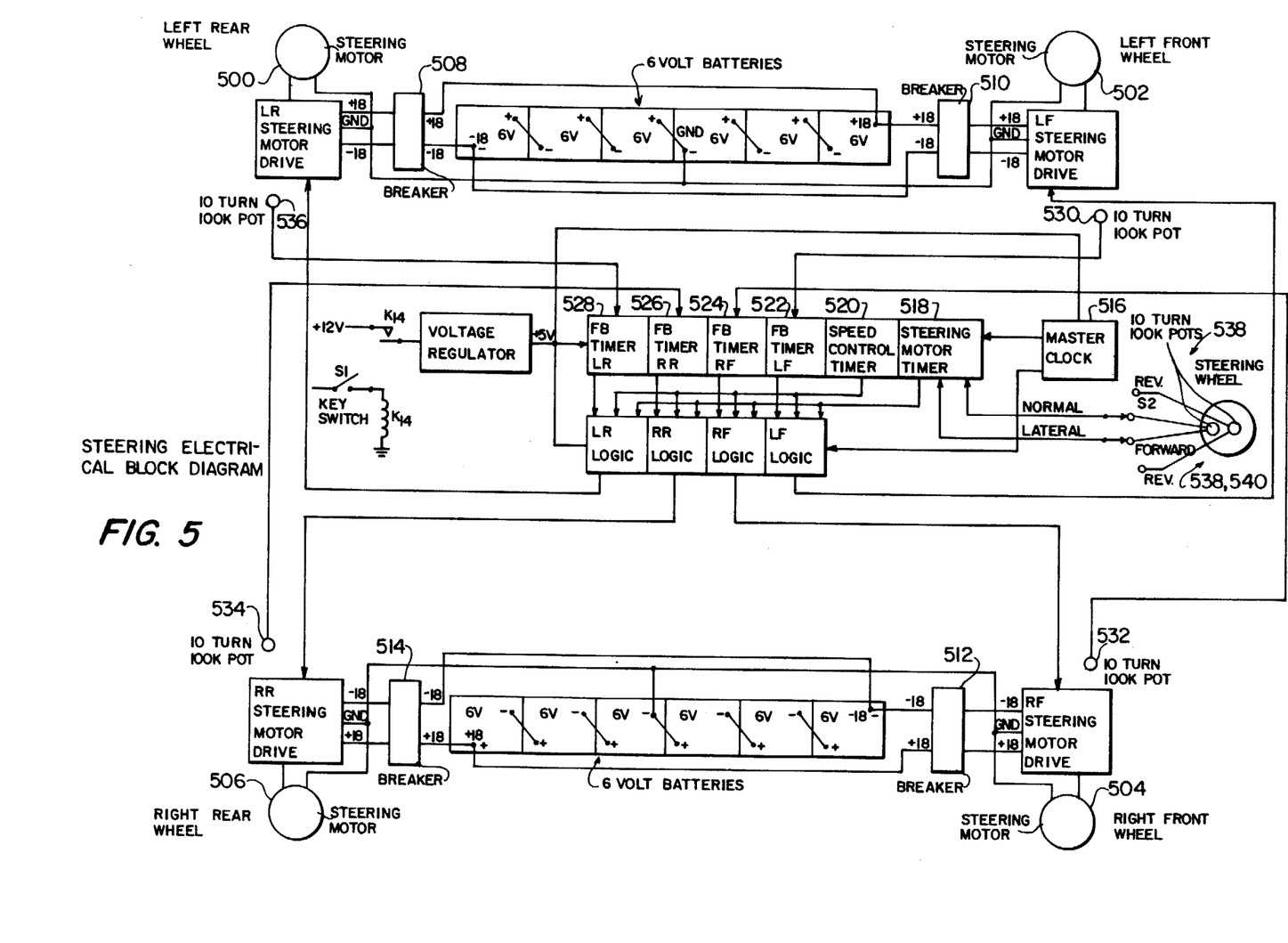
FIG. 5 is a schematic of a steering electrical block diagram.

Steering is controlled from a wheel (104) located in front of the driver seat. In the normal mode, both front wheels steer in the direction of the turn and both rear wheels opposite to the turn. In lateral steering mode both front and back wheels turn together enabling sidewards motion. Each of four wheels are driven by a ¼ HP permanent magnet motor (500, 502, 504, 506) which chain drives a 96×1 worm gear connected to each wheel fork shaft. Accurate positioning of each wheel is accomplished by a feedback drive logic controller which monitors signal pulse width changes from each wheel, compares them to the reference steering wheel pulse and forces wheels through the drive system to seek a null condition.

A master 11.5 MS clock (516, FIG. 7) provides a triggering for the steering wheel timers (518, FIG. 8), speed control timer (520) and feedback timers (522 to 528, FIG. 9) for each of the wheels. Each timer operates in a fixed frequency, variable duty cycle mode. The steering wheel timer pulse widths are controlled by two 100 K, 10 turn potentiometers (538, 540) directly connected to the steering wheel. Associated with each wheel are feedback timers (522, 524, 526, 528) which also are controlled by 100 K, 10 turn potentiometers (530, 532, 534, 536) located at each wheel. Each potentiometer directly is mounted to the wheels worm gear through a 6×1 gear reduction unit. Since the worm gear has a 96×1 reduction, the 6×1 gear causes 8 turns of the potentiometer for 180 degree wheel rotation. The master timer (FIG. 7) operates as a stable multivibrator whose frequency is determined by C1 (700), R1 (702) and R2 (704). The IC is a standard NE 556 dual timer chip. The narrow trigger pulse output (706) at a 11.5 MS frequency is applied to the steering control timers (FIG. 8, 802, 804) and each of the feedback timers (FIG. 9, 900, 902, 904, 906) all of which are NE 556 IC's operating in a monostable mode. The steering control timers (800) pulse widths vary directly with the 100 K potentiometers R1 (806), R2 (808) which are ganged together on the steering wheel for both normal and lateral steering. A normal mode potentiometer R1 (804) along with C3 (810) determine the duty cycle of that timer. When C3 (810) reaches ⅔ of the supply voltage valve charging through R1, the NE 556 output (814) goes low. With the steering wheel turned fully clockwise (hard right) maximum pulse width occurs. A hard left turn causes R1 to be a minimal resistance and normal mode output at minimum pulse width. At straight ahead position a 50% duty cycle occurs. Lateral mode potentiometer R2 (808), C1 (812) and the dual section of NE 556 IC operate as described for normal mode but with opposite changes in pulse width. The four feedback timers (522-528), 908-914) also operate the same as the steering control timers. The pulse width changes of the four output signals are proportional to the wheels rotating +90 degrees to −90 degrees from a center position and correspondingly turning the attached potentiometers R1, R2, R3, R4 (916, 918, 920, 922). R2 and R4 are wired opposite to R1 and R3.

Each feedback pulse is compared to the steering pulse and the output of Exclusive OR gate, EOR (FIG. 6, 600) is the difference of those pulse widths. The strobe gate (602) ensures that only the proper time difference is considered. This difference pulse triggers a monostable multivibrator (604), whose output pulse (variable from 50 microsec. ($\mu$s) to 300 microsec ($\mu$s)) sets the null latch. This output pulse is nominally set for 120 microsec ($\mu$s). The difference pulse is then compared at the null gate and if less than 120 microsec ($\mu$s) (approximately 1-2 wheel rotation) the null gate output remains low, disabling both enable RT gate (610) and enable LT gate (612). Reset 1 gate output (614) goes low causing latch RT (616) and latch LT (618) to reset or remain in a reset condition. Both steer right (620) and steer left (622) gate outputs go low or remain low. This is the null condition which occurs when the steering wheel and wheel positions are in alignment.

Steer right and steer left outputs for each feedback circuit are connected to the motor drive circuits (FIG. 10) for each wheel. When both outputs are low the steering motor (1000, FIG. 10) is off.

Figure 10:
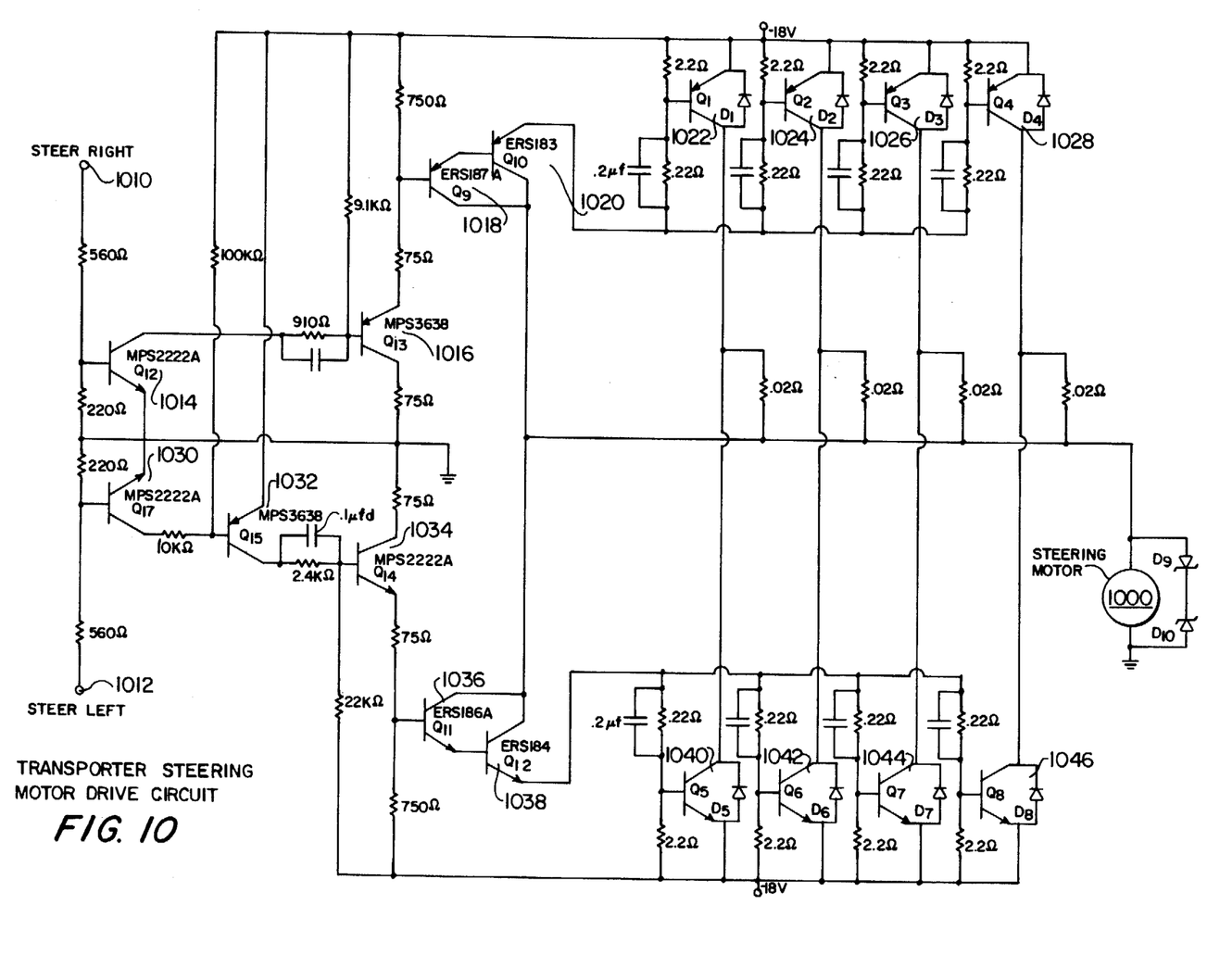
FIG. 10 is a preferred steering motor drive circuit for each wheel.

In a steering right condition, from a null state, the steering control pulse and feedback timer pulse width difference would exceed the null timer (604) pulse width (100 microsec. ($\mu$s)) and enable RT gate output (610) would go low setting latch RT (616). Steer right (620) output would then follow the speed control pulse which is an astable multivibrator variable from 50-90% duty cycle. As shown in FIG. 10, the speed control pulse (also steer RT) is applied to the motor drive circuits (1010) causing pre-drive transistors Q12 (1014), Q13 (1016) and darlington transistors Q9 (1018), Q10 (1020), Q1 (1022), Q2 (1024), Q3 (1026) and Q4 (1028) to turn on. With drive transistors Q1 through Q4 on a positive, 18 volts is applied to the corresponding steering motor (1000) moving the wheel right towards a null condition where again the steer RT (620) gate would go low and the motor would turn off.

In a steer left condition, the difference pulse (600) would cause the steer LT (622) gate to go high turning on motor drive transistors Q17 (1030), Q15 (1032), Q14 (1034), Q11 (1036), Q12 (1038), Q5 (1040), Q6 (1042), Q7 (1044), and Q8 (1046). With Q5 through Q8 on, a negative 18 volts is applied to the steering motor moving the wheel left again until a null condition is reached.

Figure 6:
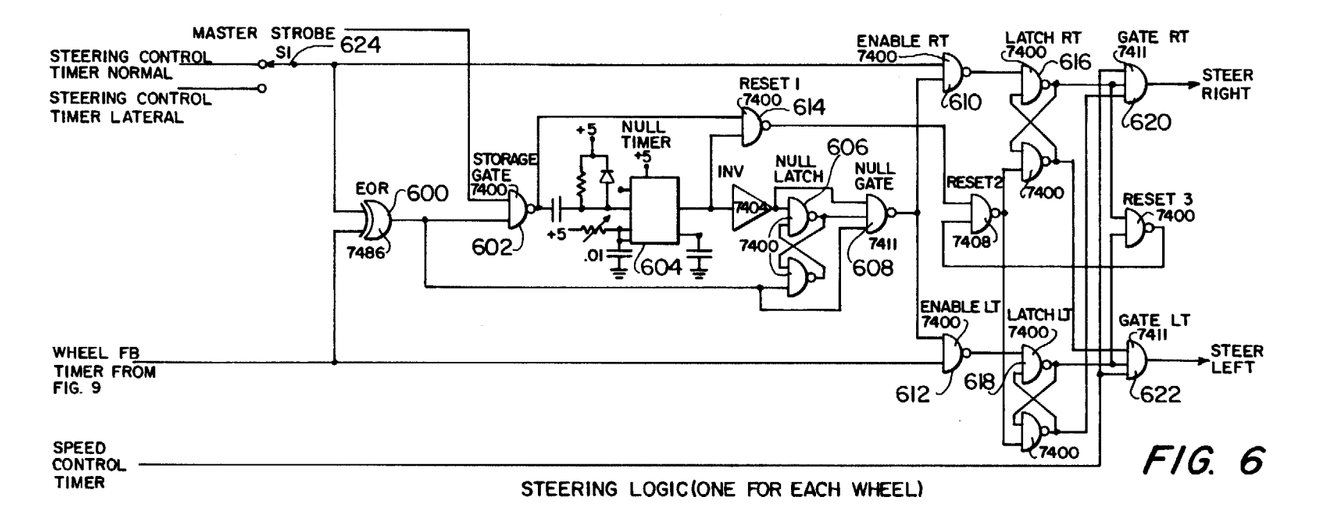
FIG. 6 is a preferred steering logic, which is taught for each of the four independently-controlled wheels of the present invention.
Figure 7:
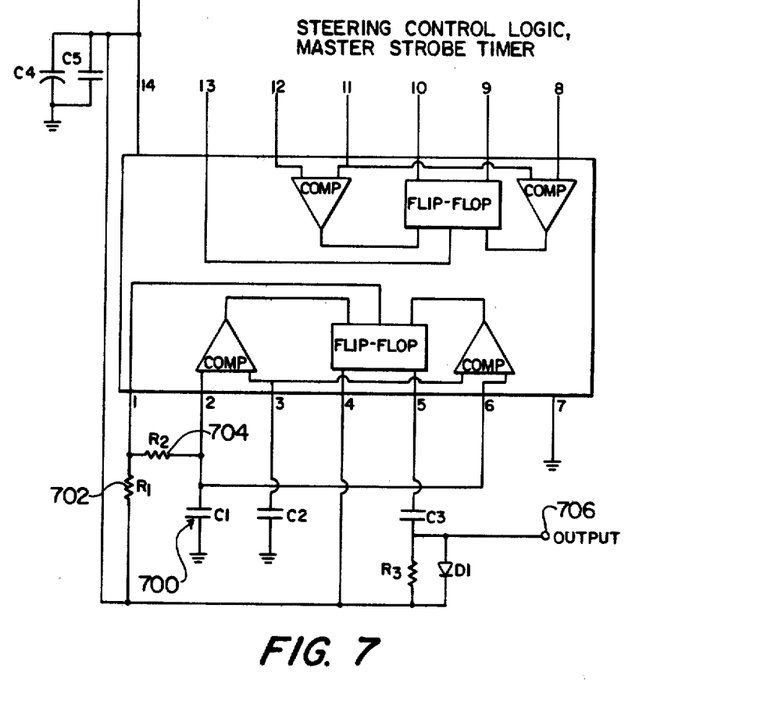
FIG. 7 is a master strobe timer for accurately controlling the steering control logic.
Figure 8:
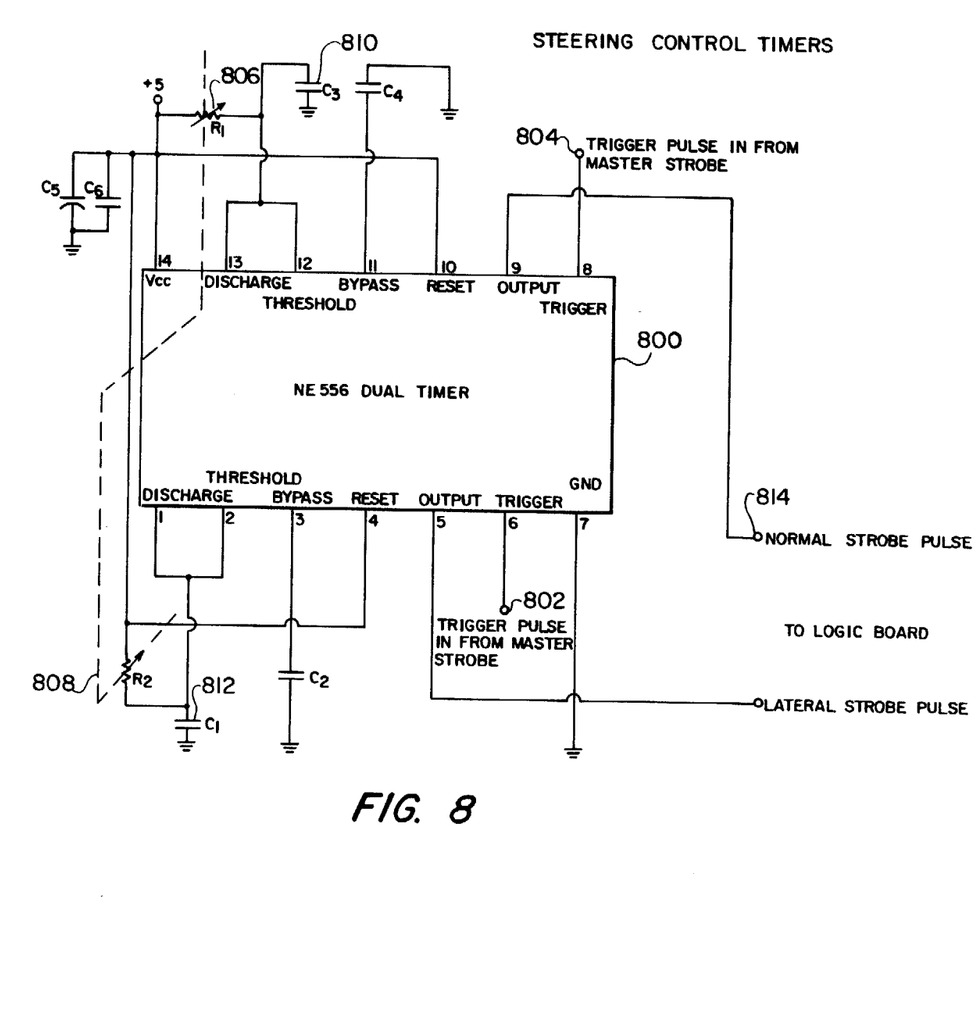
FIGS. 8 and 8a is a steering control timer and lateral steering output pulses compared to normal steering output pulses.
Figure 8A:
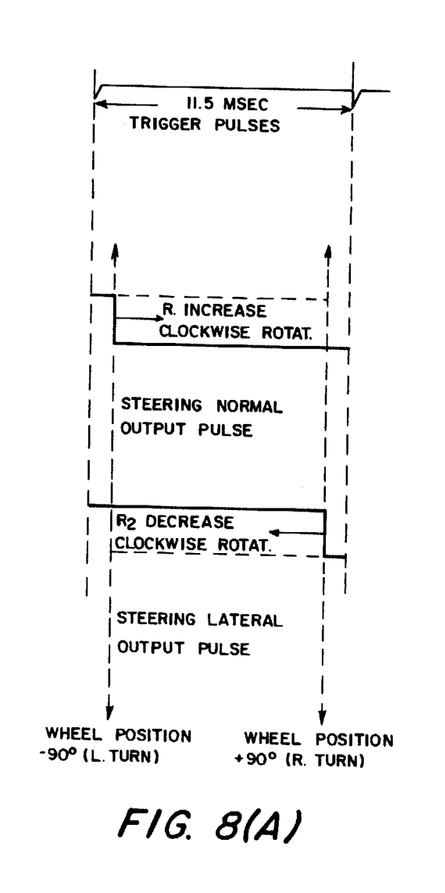
Figure 9:
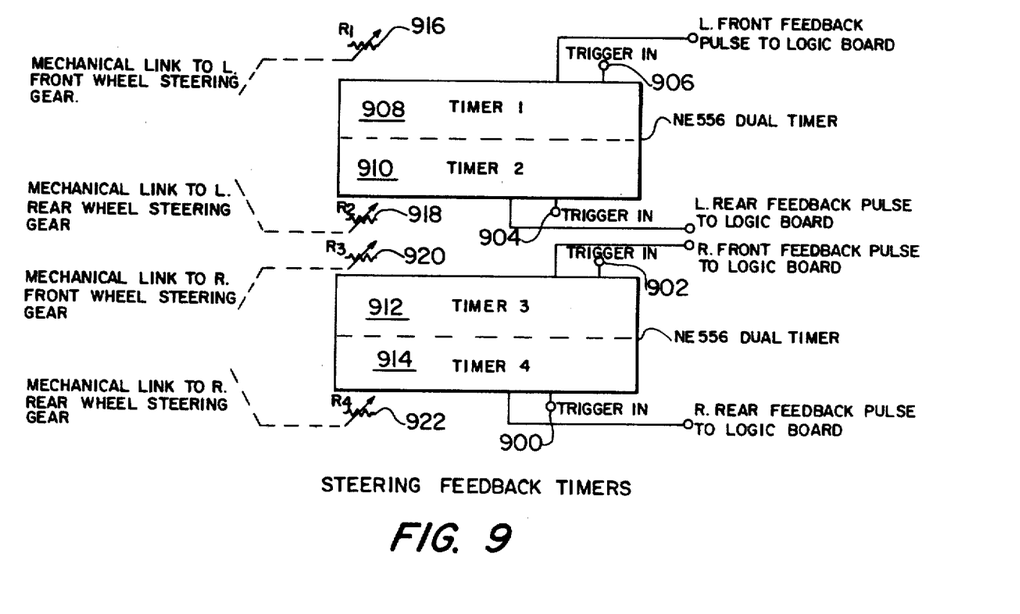
FIG. 9 is a preferred steering feedback timer circuit for each wheel.

By contrast, the lateral steering mode has distinct requirements. In the lateral steering mode, S1 (624) would apply the lateral steering control timer to the EOR gate (600) for the two rear wheel steering logic sections only. Movement of the steering wheel would then cause all four wheels to move in the same direction. In this fashion, an immediate ability to effect lateral motion is realized with turning of the vehicle itself.

To operate the vehicle in the reverse direction as a forward direction (switching driver seats) switch 2 (538) would be put into the reverse position to electrically switch both steering control potentiometers to vary resistance opposite to normal forward operation.

Figure 11:
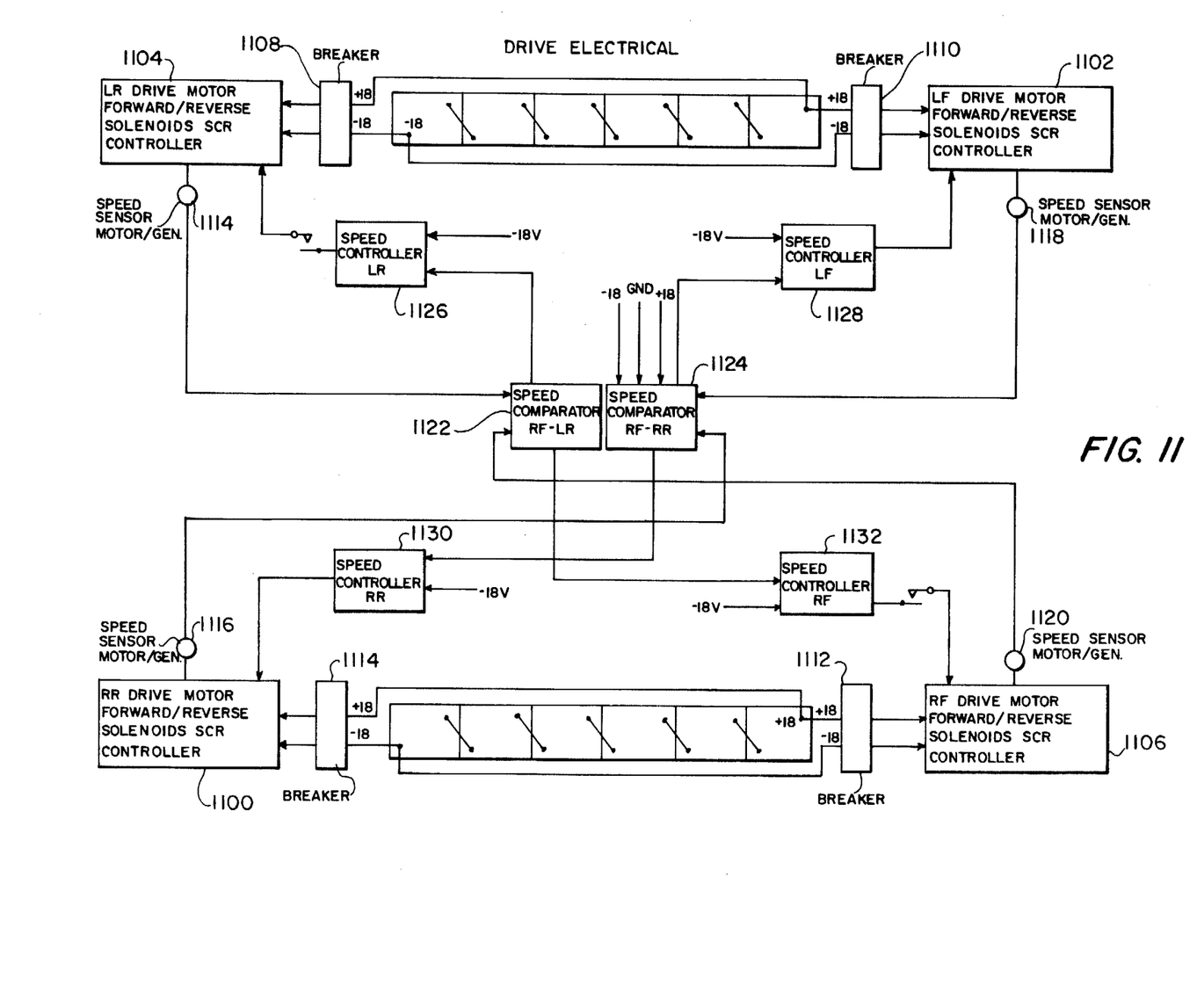
FIG. 11 is a motive drive electrical arrangement for the preferred embodiment.

Having now described the preferred embodiment for a four-wheel steering according to the principles of the present invention, a preferred diagonal wheel drive system will be taught. A preferred drive system is schematically disclosed among the FIGS. 11, 12 and 13, and the following comments are made to review the enabling disclosure presented in these figures.

Figure 12:
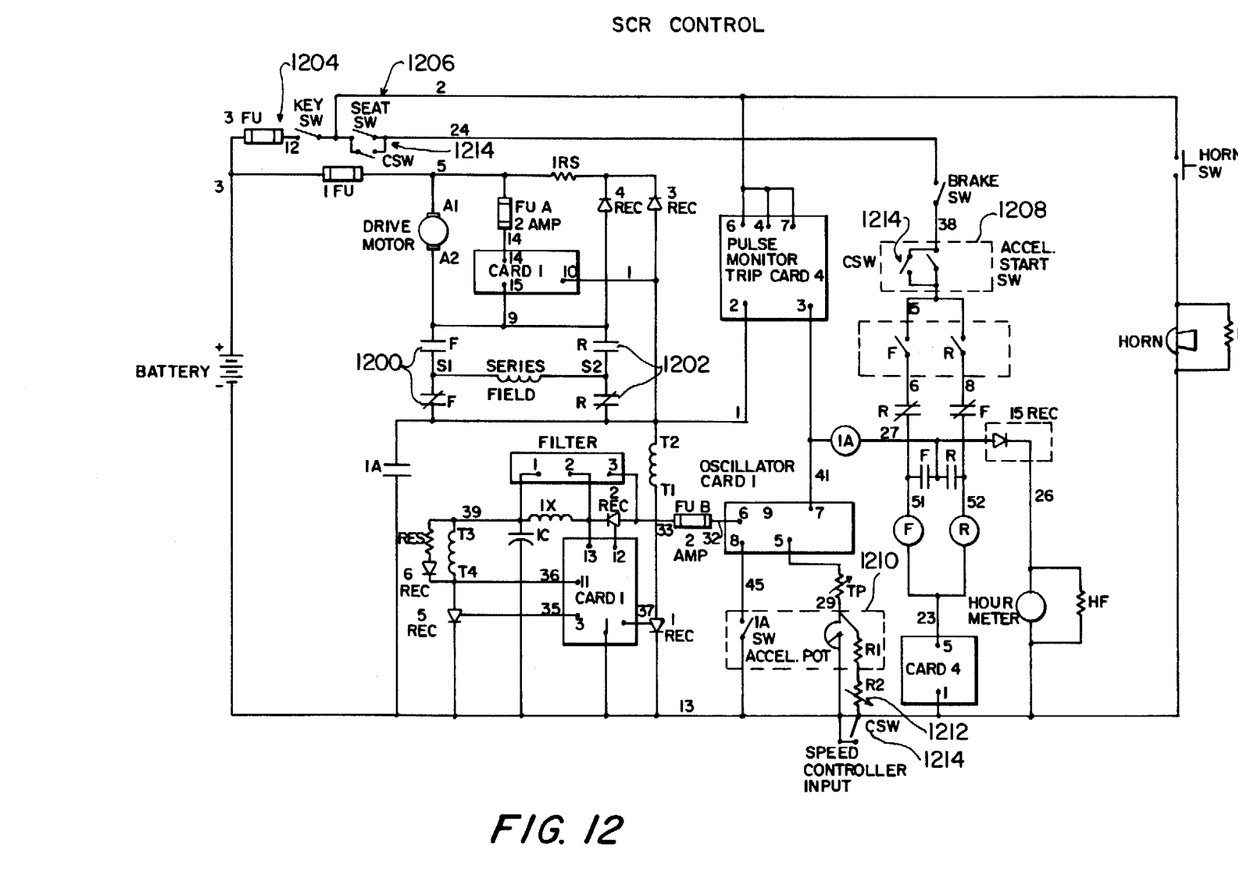
FIG. 12 is a modification for an otherwise known SCR electric speed control.
Figures 13, 13A:
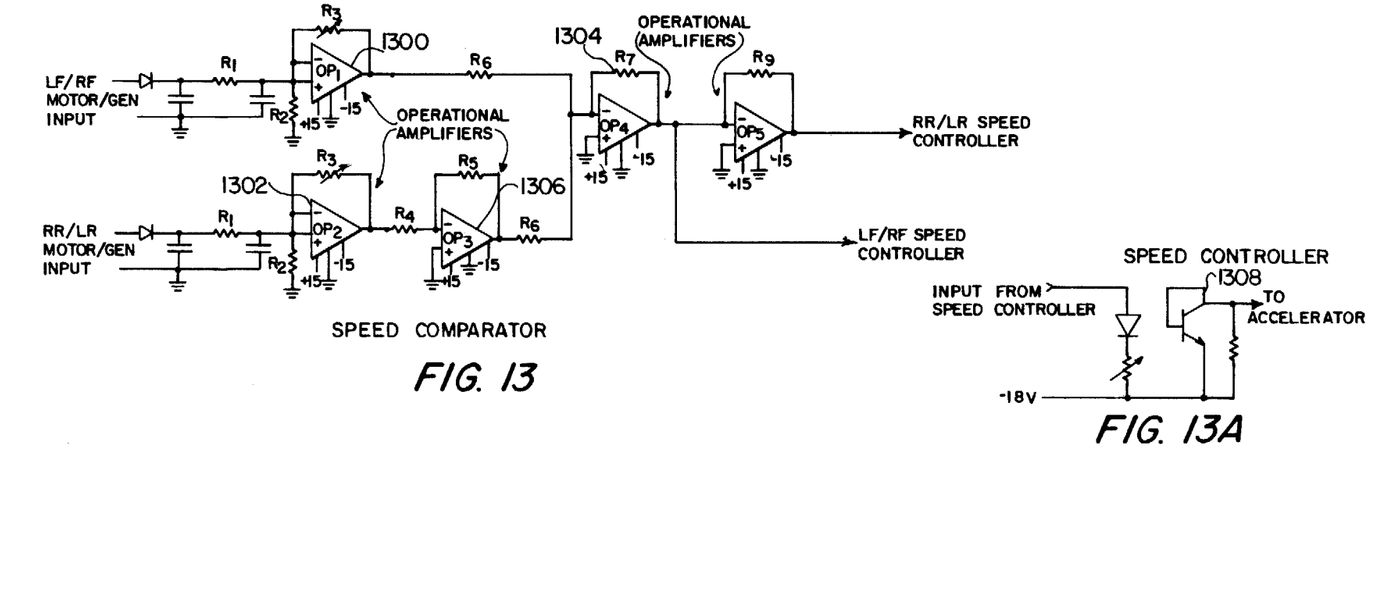
FIGS. 13 and 13a is a speed comparator device for use in combination with the control of FIG. 12.

It is actually preferred to have normal mode of traction from a two wheel diagonal drive system with the option to engage a four wheel drive for exceptionally rough terrain. A diagonal two-wheel drive allows for both normal and lateral movement and normally is sufficient. Each wheel is chain driven from a 2 HP series wound motor (1102, 1104, 1106, 1108) which is powered from a generally available GE SCR controller, modified, which has been modified as shown in FIG. 12, for this vehicle. Operation of this SCR controller generally is according to GE model 110/210/310 SCR control with the FIG. 12 and modifications which comprise a parallel operation of forward/reverse solenoids (1200, 1202), a key switch (1204), a seat switch (1206), an accelerator start switch (1208), and accelerator potentiometer (1210). Other additions to the accelerator potentiometers include a slow-speed or creep mode potentiometer R2 (1212) which is enabled through relay CSW (1214) and speed control variable photo transistors Tx1 (1308). Speed control is accomplished through a motor generator (1114, 1116, 1118, 1120) which is directly coupled to each wheel assembly drive motor. These small motors generate a voltage proportional to wheel speed, and which is filtered and applied to a speed comparator (1122, 1124). Operational amplifiers 122 (1300, 1302) buffer and amplify voltages to OP AMP 4 (1304). OP AMPS (1306) inverts one of the diagonal wheel speed sensing voltages. OP AMP 4 (1304) output is a difference of these two voltages and is applied to the corresponding drive motor speed controllers (1126 to 1132, 1308) in a push/pull mode. Speed reduction of the faster motor and speed increase in the slower motor is accomplished by applying this voltage difference to a led photo transistor pair (1308) in series with the accelerator potentiometer. A positive voltage from a faster motor generator sensor will increase resistance slowing down that wheel and correspondingly a negative voltage will be applied to the speed controller from a slower wheel, decreasing resistance in series with the accelerator pot and increasing speed to that wheel.

With respect to the modifications to a General Electric model 110/210/310 SCR controller illustrated in FIG. 12, connecting a battery applies voltage positive to wire 5, and negative to wire 13. Capacitor IC charges through wire 31.

The control circuit is energized by closing the key switch, the seat switch, the brake switch, and moving the forward or reverse lever to either position and then depressing the accelerator closing the accelerator start switch. The F or R contactor coil is now energized, applying power to the drive motor circuit. Positive control power is fed through F or R interlock to wire 27, through the 1A coil to wire 41 to the oscillator card terminal 7.

The oscillator section will oscillate only when it receives positive power through the F or R interlock, a synchronizing control signal from the anode of 1 REC (wire 33, term 6), and the capacitor is charged. The oscillator output is fed from wire 37 to the gate of 1 REC, the main SCR. This is the gate signal which will switch 1 REC to the conducting state. When 1 REC is conducting, current flow is from battery positive through 1 FU, drive motor T2-T1, 1 REC, and back to battery negative. The initial rising d-c current through T2-T1 induces a voltage from T4 to T3, and drives T4 positive. An oscillator in the card fires 5 REC by applying a gate pulse out of Term 3 (wire 35), and 5 REC assumes a conducting state. Current then flows from T4 through 5 REC, 1C and bck to T3 charging the capacitor negative until the transformer saturates, reducing the current flow to zero. When the current drops to zero, 5 REC shuts off. When the transformer saturates 2 REC is fired by a gate pulse out of terminal 12 (wire 30) turning 2 REC on. When 2 REC conducts, capacitor 1C discharges around the circuit composed of 1C, 1 REC, 2 REC and IX. This discharge current opposes the battery current through 1 REC so that the resultant current is zero. With reverse voltage across 1 REC (the main SCR), 1 REC is turned off. Current continues to flow in the 2 REC, 1C, and battery loop until the capacitor is fully charged. 2 REC then turns off.

This above paragraph illustrates conventional operation for one complete cycle or pulse as provided by associated G.E. literature, and further appreciation of our application should readily appear from considering the self-explanatory speed control represented by the preferred circuit of FIG. 13, as described herebefore.

While we now have made an enabling disclosure of a preferred embodiment of our invention, the invention is to be defined by the scope of the appended claims.

We claim:

1. In a multi-wheel transporter vehicle of the straddle-type comprising first, second, third and fourth vertically extending corner upright members, each corner upright further comprising a wheel assembly at the lower end thereof and first drive means operable to control one or more of said wheel assemblies, the improvement comprising:
   (a) a left-side longitudinally extending base unit connected between and proximate the lower ends of the first and third uprights and a right-side longitudinally extending base unit connected between and proximate lower ends of the second and fourth uprights;
   (b) a front-side transversely extending brace unit connected between and proximate the upper ends of the first and second uprights, and a rear-side transversely extending brace unit connected proximate and between the upper ends of the third and fourth uprights; and
   (c) a longitudinally extending endless conveyor platform assembly including second drive means for selectively defining a linear motion in the longitudinal direction for said conveyor, between said uprights, wherein said conveyor platform is supported proximate its forward end and rearward end by third drive means operable to vertically translate said platform assembly between a first position proximate the lower end of said uprights and a second position proximate the upper ends of said uprights, thereby enabling the first and second uprights and the third and fourth uprights transversely to straddle vertically extending obstacles therebetween, while maintaining an ability to provide a longitudinal conveyance for loads superposed upon said conveyor means.

2. An improved transporter according to claim 1, wherein said first drive means further comprises an individual source of power and drive means for at least one of said wheel assemblies, and control of said first drive means further comprises motor generators at each driven wheel operable to generate a signal proportional to rotational speed of that wheel, and further a speed comparator means operable to process each of said signals and generate a selective control signals which are operable to be fed to a speed controller for each driven wheel.

3. An improved transporter according to claim 2, wherein two wheel assemblies are driven, and said wheel assemblies are diagonally opposite one another.

4. An improved transporter according to claim 2, wherein said first drive means further comprises a steering means connected to a separate source of motive power for selectively rotating one or more of said wheel assemblies about a substantially verticle axis, wherein a steering control signal for wheel assemblies at first and second columns normally is independent of a steering control signal for wheel assemblies at the third and fourth columns, thereby enabling a normal steering mode, wherein for a generally-longitudinal motion of said transporter both front wheels are operable to steer in the direction of a turn, while both rear wheels are enabled to steer in a direction opposite the direction of the turn, wherein further in a lateral steering mode, for a generally lateral motion of said transporter, both sets of front and rear wheels are operable to turn in the same direction, thereby to enable a substantially lateral movement of said transporter.

5. An improved transporter according to claim 1, wherein said endless conveyer platform assembly further comprises a plurality of laterally extending slats, at least one longitudinally and vertically extending endless roller chain and means to removably connect each said slat to a roller chain segment and in a manner wherein the slats are spaced upon said endless chain to allow dirt and small particles to pass between adjacent slats, wherein further the second drive means for linear motion of said conveyer comprises a conveyer frame supporting a conveyor motive power means which is connected to a sprocket drive assembly in a driving connection to said endless conveyor, and said frame is supported for vertical translation with said platform assembly, thereby enabling a conveying function independent of the vertical position of said platform assembly.

6. An improved transporter according to claim 1, wherein the third drive means for producing vertical movement of said conveyor platform assembly further comprises a source of motive power connected to a transversely extending conveyor drive shaft proximate and between the upper ends of uprights, wherein a motion translating means interconnects said drive shaft with said conveyor platform assembly, and is operable to translate rotational motion of said drive shaft to vertical motion of said vertical platform assembly in response to an input from a selective vertical position control device.

7. An improved transporter according to claim 1, wherein each of said vertical uprights further comprises a tubular member having a vertically extending guide means operable to cooperate with guide elements upon said conveyor platform assembly, and said third drive means is supported upon said uprights, and is adapted to raise and lower vertically said conveyor platform assembly within the limits of the constraints imposed by said guide means.

8. An improved transporter according to claim 1 wherein one of said longitudinally extending base units further comprises a control station vertically spaced thereabove and operable to enable an operator to direct movement of said transporter from a choice of sitting positions, facing either frontward or rearward.

9. An improved transporter according to claim 1 further comprising a first control for said first drive means, a second control for said second drive means and a third control for said third drive means, wherein said first control means further comprises means to generate a speed control pulse which selectively is applied to one or more of said wheel assemblies to supply traction forces for said transporter and means to generate a steering control pulse, wherein normal and lateral steering modes are defined for each of said four wheel assemblies.

10. An improved transporter according to claim 1 where said longitudinally extending base units further comprise storage locations for batteries as a power source, and said first source and second drive means further comprise electric drive motors interconnected through speed reduction units to the respective driven members.

* * * * *